(12) United States Patent
Curtis et al.

(10) Patent No.: US 8,510,029 B2
(45) Date of Patent: Aug. 13, 2013

(54) WAYPOINT SPLINING FOR AUTONOMOUS VEHICLE FOLLOWING

(75) Inventors: Joshua J. Curtis, Huntsville, AL (US); George T. McWilliams, Germantown, MD (US); Kristopher C. Kozak, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 13/269,039

(22) Filed: Oct. 7, 2011

(65) Prior Publication Data

US 2013/0090802 A1 Apr. 11, 2013

(51) Int. Cl.
G06G 7/78 (2006.01)

(52) U.S. Cl.
USPC ........... 701/301; 701/70; 701/45; 701/408; 701/412; 701/462; 340/933; 356/3.01; 356/3.1; 356/3.13; 356/11; 356/622

(58) Field of Classification Search
None
See application file for complete search history.

(56) References Cited

U.S. PATENT DOCUMENTS

| | | | | |
|---|---|---|---|---|
| 4,703,429 A * | 10/1987 | Sakata | | 701/96 |
| 4,706,195 A * | 11/1987 | Yoshino et al. | | 701/96 |
| 5,039,217 A * | 8/1991 | Maekawa et al. | | 356/3.01 |
| 5,053,964 A * | 10/1991 | Mister et al. | | 701/19 |
| 5,053,979 A * | 10/1991 | Etoh | | 700/304 |
| 5,234,071 A * | 8/1993 | Kajiwara | | 180/169 |
| 5,566,288 A | 10/1996 | Koerhsen | | |
| 5,572,449 A * | 11/1996 | Tang et al. | | 700/304 |
| 5,615,116 A * | 3/1997 | Gudat et al. | | 701/23 |
| 5,731,820 A * | 3/1998 | Broekhuijsen | | 345/442 |
| 5,934,399 A * | 8/1999 | Iiboshi et al. | | 180/169 |
| 6,032,097 A * | 2/2000 | Iihoshi et al. | | 701/96 |
| 6,128,559 A * | 10/2000 | Saitou et al. | | 701/23 |
| 6,134,497 A * | 10/2000 | Hayashi et al. | | 701/70 |
| 6,205,381 B1 * | 3/2001 | Motz et al. | | 701/25 |
| 6,246,932 B1 * | 6/2001 | Kageyama et al. | | 701/24 |
| 6,301,542 B1 * | 10/2001 | Kirchberger et al. | | 701/93 |
| 6,356,820 B1 * | 3/2002 | Hashimoto et al. | | 701/23 |
| 6,640,164 B1 | 10/2003 | Farwell et al. | | |
| 6,732,024 B2 * | 5/2004 | Rekow et al. | | 701/26 |
| 6,782,306 B2 * | 8/2004 | Yutkowitz | | 700/189 |
| 6,882,923 B2 * | 4/2005 | Miller et al. | | 701/96 |
| 6,968,592 B2 * | 11/2005 | Takeuchi et al. | | 15/319 |
| 7,062,381 B1 * | 6/2006 | Rekow et al. | | 701/300 |
| 7,228,227 B2 * | 6/2007 | Speer | | 701/467 |
| 7,382,274 B1 | 6/2008 | Kermani et al. | | |
| 7,444,240 B2 | 10/2008 | MacNeille et al. | | |
| 7,509,199 B2 * | 3/2009 | Rekow | | 701/50 |
| 7,658,694 B2 * | 2/2010 | Ungari | | 482/1 |
| 7,734,419 B2 * | 6/2010 | Kondoh | | 701/301 |
| 7,818,090 B2 * | 10/2010 | Okamoto | | 700/253 |
| 7,894,982 B2 * | 2/2011 | Reeser et al. | | 701/420 |
| 7,953,526 B2 * | 5/2011 | Durkos et al. | | 701/25 |

(Continued)

*Primary Examiner* — Thomas Tarcza
*Assistant Examiner* — Richard Goldman
(74) *Attorney, Agent, or Firm* — Tucker Grossman, et al.

(57) ABSTRACT

A method for defining a following path for a following vehicle to autonomously follow a leader, the method including acquiring waypoints associated with a path that the leader traverses; filtering the acquired waypoints, wherein the filtering removes waypoints located outside an area of interest; generating intermediate waypoints by interpolating between adjacent pairs of the filtered waypoints if the adjacent pairs of the filtered waypoints are separated by a distance that exceeds a threshold distance; and defining a following path through the filtered waypoints and the intermediate waypoints using a least-squares spline fit to calculate the following path.

20 Claims, 6 Drawing Sheets

(56) References Cited

U.S. PATENT DOCUMENTS

| | | | |
|---|---|---|---|
| 7,974,738 B2 * | 7/2011 | Bruemmer et al. | 700/255 |
| 7,994,902 B2 * | 8/2011 | Avery et al. | 340/435 |
| 8,073,564 B2 | 12/2011 | Bruemmer et al. | 700/245 |
| 8,081,297 B2 * | 12/2011 | Bridges et al. | 356/3.01 |
| 8,116,921 B2 * | 2/2012 | Ferrin et al. | 701/1 |
| 8,195,342 B2 * | 6/2012 | Anderson | 701/1 |
| 8,195,358 B2 * | 6/2012 | Anderson | 701/30.3 |
| 8,200,428 B2 * | 6/2012 | Anderson | 701/453 |
| 8,229,618 B2 * | 7/2012 | Tolstedt et al. | 701/23 |
| 2003/0060973 A1 | 3/2003 | Mathews et al. | 701/209 |
| 2004/0158358 A1 * | 8/2004 | Anezaki et al. | 700/264 |
| 2005/0216124 A1 * | 9/2005 | Suzuki | 700/253 |
| 2006/0106496 A1 * | 5/2006 | Okamoto | 700/253 |
| 2006/0259213 A1 * | 11/2006 | Hashimoto et al. | 701/23 |
| 2007/0156286 A1 * | 7/2007 | Yamauchi | 700/245 |
| 2007/0219720 A1 | 9/2007 | Trepagnier et al. | |
| 2008/0009964 A1 * | 1/2008 | Bruemmer et al. | 700/245 |
| 2008/0059007 A1 | 3/2008 | Whittaker et al. | |
| 2008/0059015 A1 | 3/2008 | Whittaker et al. | |
| 2008/0071465 A1 * | 3/2008 | Chapman et al. | 701/117 |
| 2008/0208454 A1 * | 8/2008 | Pesterev et al. | 701/206 |
| 2009/0037033 A1 | 2/2009 | Phillips et al. | |
| 2010/0063663 A1 * | 3/2010 | Tolstedt et al. | 701/23 |
| 2010/0063680 A1 * | 3/2010 | Tolstedt et al. | 701/41 |
| 2010/0106356 A1 | 4/2010 | Trepagnier et al. | |
| 2010/0198513 A1 | 8/2010 | Zeng et al. | |
| 2010/0256835 A1 | 10/2010 | Mudalige | |
| 2010/0256836 A1 | 10/2010 | Mudalige | |
| 2010/0256852 A1 | 10/2010 | Mudalige | |
| 2011/0040482 A1 * | 2/2011 | Brimble et al. | 701/301 |
| 2011/0112730 A1 * | 5/2011 | Rekow | 701/50 |
| 2011/0125344 A1 | 5/2011 | An et al. | |
| 2011/0172850 A1 * | 7/2011 | Paz-Meidan et al. | 701/2 |
| 2011/0173015 A1 * | 7/2011 | Chapman et al. | 705/1.1 |
| 2011/0251768 A1 * | 10/2011 | Luo et al. | 701/70 |
| 2012/0095651 A1 * | 4/2012 | Anderson | 701/50 |
| 2012/0150425 A1 * | 6/2012 | Chapman et al. | 701/119 |

* cited by examiner

WAYPOINT SPLINING FOR AUTONOMOUS VEHICLE FOLLOWING

FIELD OF INVENTION

The present disclosure relates to autonomous vehicle following, and in particular the splining of acquired waypoints associated with a leader to define a following path for autonomous vehicle following.

BACKGROUND

Unmanned ground vehicles capable of autonomous navigation are useful for many purposes and have applications in both military and commercial settings. For example, they may reduce exposure of humans to potentially dangerous situations, reduce manpower requirements in shipping operations, increase traffic flow efficiency and provide pedestrians with hands free operation of a vehicle that can carry their belongings. The state of the art in autonomous navigation generally focuses on the ability to sense and interpret the surrounding environment through on-board sensors and/or a priori map data and make decisions in real-time regarding the path to follow. Such autonomous navigation systems can be complex, expensive and are not always capable of achieving a level of reliability that may be required for a particular application.

What is needed, therefore, is an improved method for autonomous navigation of unmanned ground vehicles that offers increased reliability with reduced cost and complexity.

SUMMARY

The present disclosure describes path estimation for autonomous vehicle following based on the acquisition of waypoints associated with a leader. The leader may be a pedestrian or another vehicle which may be manned, tele-operated, or also autonomous with sensors and systems that enable the leader vehicle to derive a correct path to a destination. The following vehicle may acquire waypoints from the leader through use of a global positioning sensor (GPS), a laser incident distance and ranging (LiDAR) sensor or a combination of the two. The acquired waypoints may be pre-processed (including filtering, interpolation and cropping, for example) to improve accuracy and then spline fitted to define a following path that is calculated to estimate the traversed path of the leader. The autonomous following vehicle may then be driven along the calculated path.

BRIEF DESCRIPTION OF DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
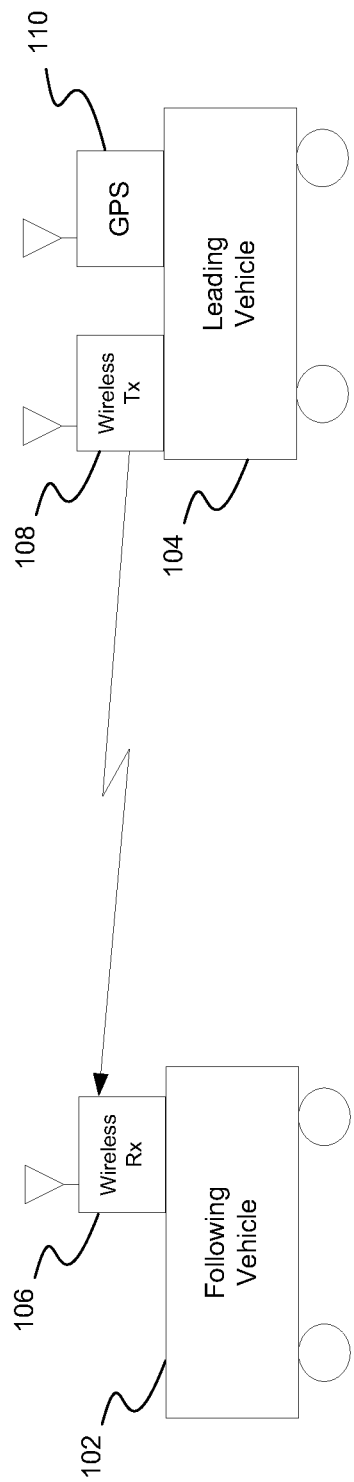
FIG. 1 illustrates a system diagram of one exemplary embodiment consistent with the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

The present disclosure relates to autonomous vehicle following, and in particular the splining of waypoints associated with a leader and acquired by the following vehicle to estimate a path for autonomous vehicle following. The leader may be a pedestrian or another vehicle, which may be manned, tele-operated, or also autonomous with sensors and systems that enable the leader vehicle to derive a correct path to a destination. The following vehicle may acquire waypoints from the leader through use of a global positioning sensor (GPS), a laser incident distance and ranging (LiDAR) sensor or a combination of the two. The acquired waypoints may be pre-processed (including filtering, interpolation and cropping, for example) to improve accuracy and then spline fitted to a curve that is calculated to estimate the traversed path of the leader as will be explained in greater detail below. The autonomous following vehicle may then be driven along the calculated path.

Providing an unmanned ground vehicle with the capability to identify and follow a leader in an autonomous manner may reduce exposure of humans to potentially dangerous situations, reduce manpower requirements in shipping operations, increase traffic flow efficiency and/or provide pedestrians with hands free operation of a vehicle that can carry their belongings.

Referring now to FIG. 1, there is shown a system diagram 100 of one exemplary embodiment consistent with the present disclosure. In this embodiment, an autonomous following vehicle 102 follows a leading vehicle 104. Although only one following vehicle is shown for simplicity, in practice any number of following vehicles may be deployed. The leading vehicle 104 may determine its geographic position at suitable time intervals through use of a GPS 110. These positions, which may be accompanied by timestamps and/or other navigational information, are transmitted through wireless transmitter 108. This transmitted information is received by wireless receiver 106 on the following vehicle 102 for use as a waypoint as will be described in greater detail below. The leading vehicle may also transmit identity information allowing the following vehicle to identify the appropriate leading vehicle to follow. This may be useful, for example, where there are multiple leading vehicles, each with its own convoy of following vehicles. In some embodiments, the leader may be a pedestrian rather than a vehicle and the pedestrian may be equipped with a GPS and wireless transmitter enabling a system to operate in the manner described above.

Figure 2:
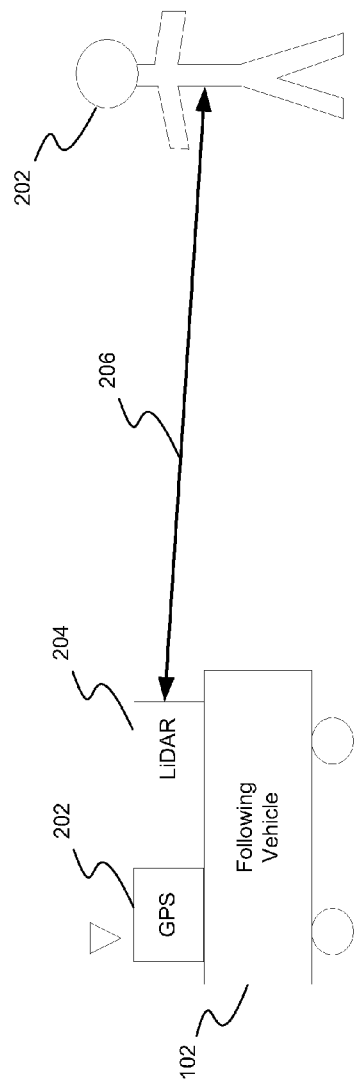
FIG. 2 illustrates a system diagram of another exemplary embodiment consistent with the present disclosure.

Referring now to FIG. 2, there is shown a system diagram 200 of another exemplary embodiment consistent with the present disclosure. In this embodiment, an autonomous following vehicle 102 follows a pedestrian leader 202, although the leader could just as well be a vehicle as described above in connection with FIG. 1. Although only one following vehicle is shown for simplicity, in practice any number of following vehicles may be deployed. The following vehicle 102 may determine its own geographic position at suitable time intervals through use of a GPS 202. The following vehicle 102 may then determine a distance and direction 206 from the following vehicle 102 to the pedestrian 202 through use of a LiDAR 204 on the following vehicle 102. The LiDAR determines distance to an object by measuring the time delay of a laser pulse that is transmitted to and reflected back from the object. The direction is determined based on the direction that the LiDAR is pointed when transmitting and/or receiving the laser pulse. The location of the pedestrian 202 may then be determined by translating the GPS based location of the following vehicle 102 by an offset corresponding to the distance and direction 206 to the pedestrian. This determined location of the pedestrian 202 may then be used as a waypoint by the following vehicle 102 as will be described in greater detail below.

Figure 3:
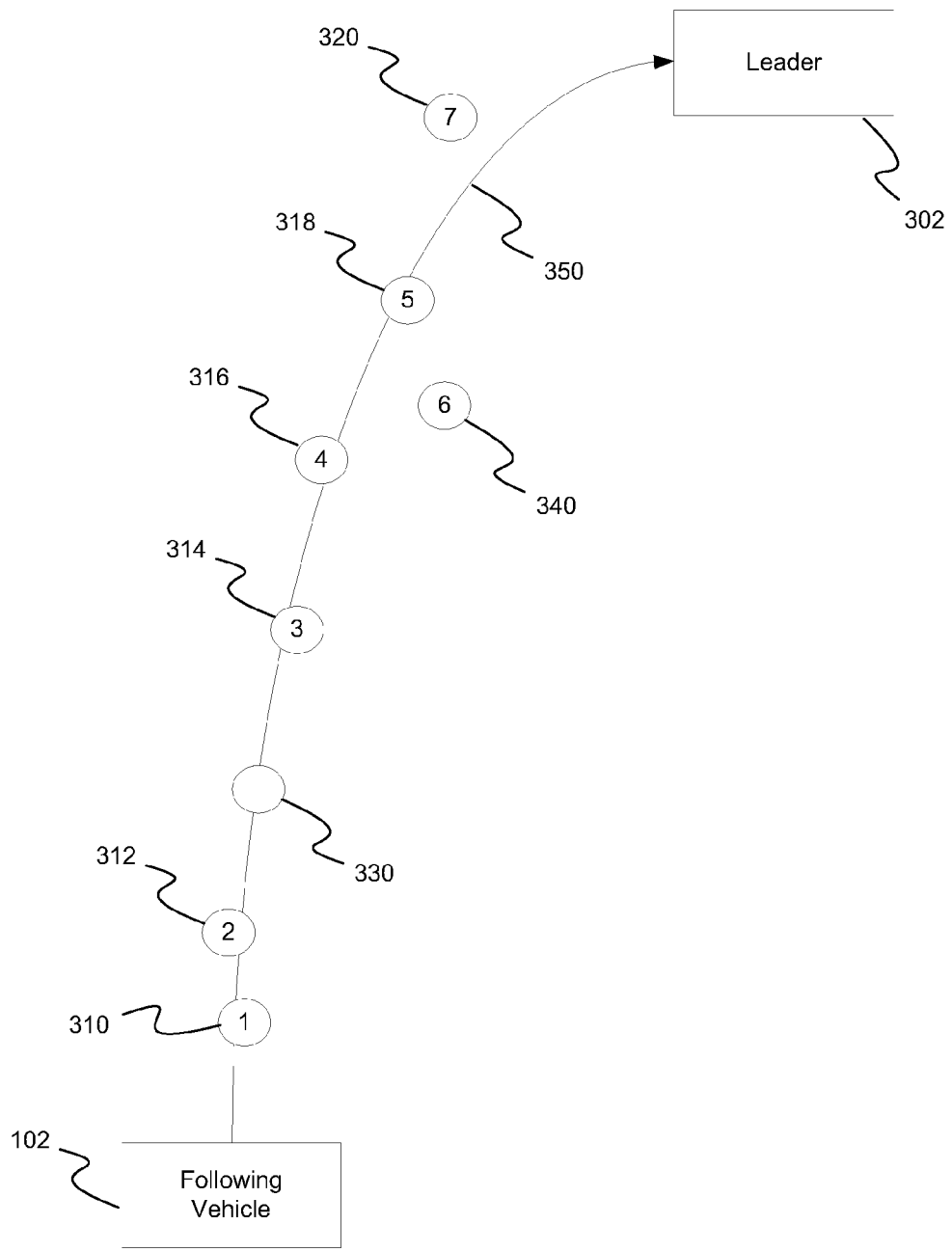
FIG. 3 illustrates waypoint filtering and path calculation of one exemplary embodiment consistent with the present disclosure.

Referring now to FIG. 3, there is shown an illustration of waypoint filtering and path calculation 300 consistent with one exemplary embodiment of the present disclosure. The following vehicle 102 acquires waypoints from the leader 302 which may be a leading vehicle 104 or a pedestrian 202. Waypoint 310 is acquired at time 1, waypoint 312 at subsequent time 2, waypoint 314 at subsequent time 3, waypoint 316 at subsequent time 4, waypoint 318 at subsequent time 5, waypoint 340 at subsequent time 6 and waypoint 320 at subsequent time 7. Acquisition times 1 through 7 need not occur at equally spaced time intervals.

As can be seen in this illustration, the acquired waypoints may provide a general indication of the traversed path of the leader 302 but they do not necessarily all lie on a smooth curve. One reason for this is that the acquired waypoints are subject to measurement errors, for example in the GPS or LiDAR systems. For example, waypoint 340 at time 6 is located behind waypoint 318 at time 5 which, if believed to be accurate, would indicate that the path is looping back on itself.

Waypoint 340 may instead be considered to lie outside of an area of interest and thus be removed during a filtering operation on the acquired waypoints to improve the leader path estimation process that results in a following path represented by the curve 350. The location of an acquired waypoint being outside an area of interest may be understood as that situation where the acquired waypoint may lie one to ten degrees (1-10°) outside of a course heading between the immediately preceding waypoint and a subsequent waypoint, including all values in said range in one degree increments. Accordingly, the aforementioned range may be 1-9°, 1-8°, 1-7°, 1-6°, 1-5°, 1-4°, 1-3°, 1-2° or even 1°. As one may further appreciate, the system may be configured to select the particular values depending upon the circumstances of the situation including, for example, the leader speed, the nature of the terrain and the waypoint acquisition sampling rate.

By way of further illustration, waypoint 320 also appears to deviate from the estimated following path 350, to a greater extent than the other waypoints, but the deviation may not be severe enough to place it outside the area of interest and thus, in some embodiments, may survive the filtering operation.

Also, as can be seen in this illustration, adjacent waypoints 312 and 314 are separated by a distance that is greater than the distance between other pairs of waypoints. An interpolation operation may be performed to generate an intermediate waypoint 330 between waypoints 312 and 314, or any other adjacent pairs of waypoints, that are separated by a distance that exceeds a threshold distance. The threshold distance may, for example, be any value in the range of 1 to 500 feet. Accordingly, the threshold distance may be 1 foot, 2 feet, 3 feet, up to 500 feet, in one foot increments. Again, one may appreciate that the system may be configured to select the particular value depending upon the circumstances of the situation. If a single interpolated waypoint is insufficient to fill in a region of sparsely acquired waypoints in this manner, additional interpolated waypoints may be generated. The generation of interpolated waypoints creates a more evenly distributed pattern of points which may reduce the possibility of weighting errors during the curve-fitting process.

Figure 4:
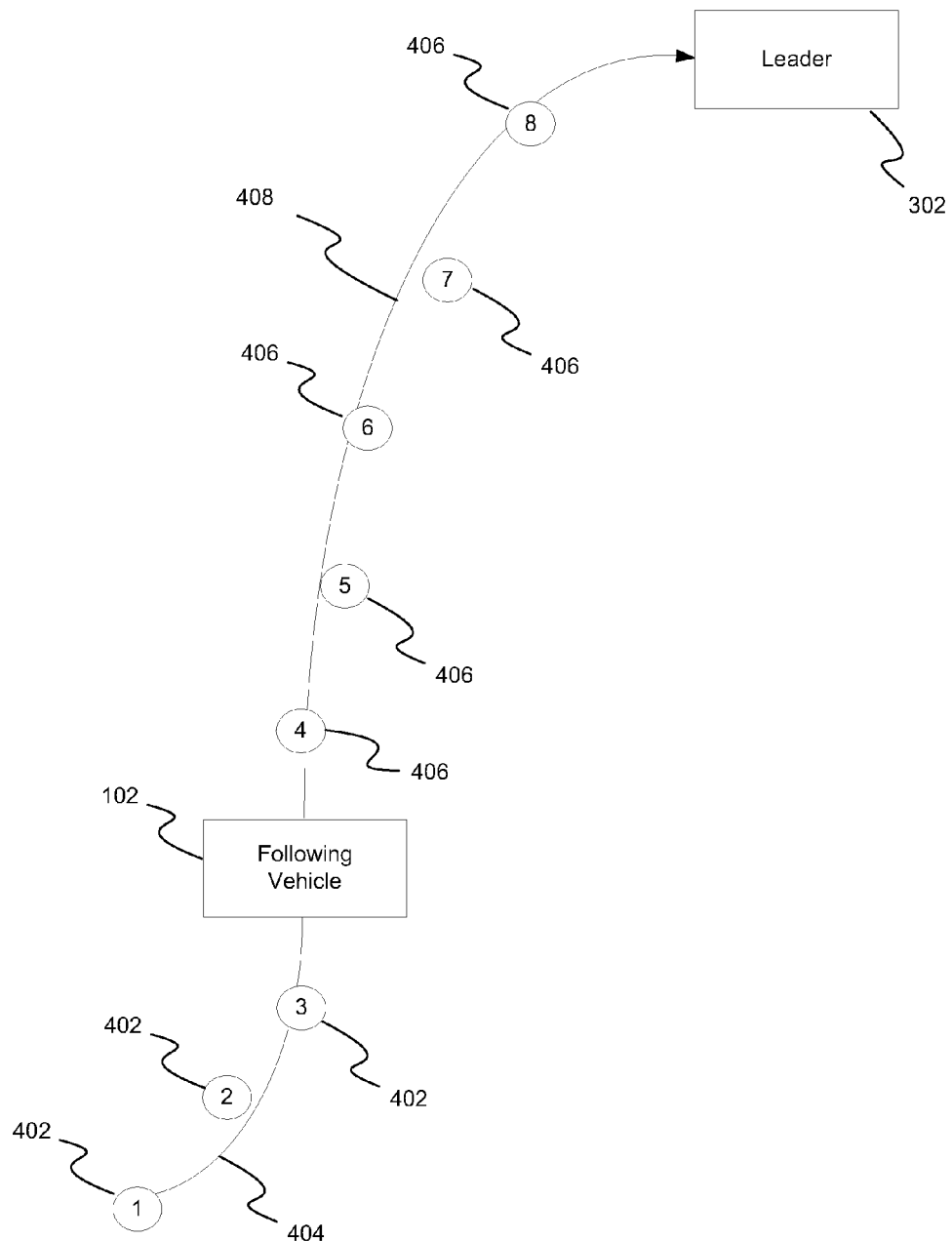
FIG. 4 illustrates waypoint filtering and path calculation of another exemplary embodiment consistent with the present disclosure.

Referring now to FIG. 4, there is shown an illustration of waypoint filtering and path calculation 400 consistent with another exemplary embodiment of the present disclosure. The following vehicle 102 acquires waypoints from the leader 302 which may be a leading vehicle 104 or a pedestrian 202. Acquired waypoints 402 lie behind the following vehicle 102 and are associated with the earlier in time estimated leader traversed path 404. Acquired waypoints 406 lie between the following vehicle 102 and the leader 302 and are associated with the currently estimated leader traversed path 408. While the leader 302 is in motion, new waypoints will be acquired and used to update the estimated leader traversed path 408. As the following vehicle 102 drives along the estimated leader traversed path 408, waypoints will be moved from ahead of the following vehicle 102 to behind it.

Most, but not all, of waypoints 402 behind the following vehicle 102 may be cropped after a period of time as their usefulness in the curve fitting process going forward diminishes. Some of the waypoints 402, however, may be kept to maintain curve connectivity and continuity. For example, when the waypoint 402 behind the following vehicle are computed to generate 5 degrees or more of a course change to the course path 408 (calculated without waypoints 402) the waypoints 402 may be cropped in the ensuing curve fitting process. Here again, one may appreciate that the system may be configured to select the particular values depending upon the circumstances of the situation.

The currently estimated leader traversed path 408 may be further processed to determine the curve length or path distance between the following vehicle 102 and the leader 302. This information may be useful to set or maintain the speed and following distance of the following vehicle 102 so that it does not run out of drivable path.

Figure 5:
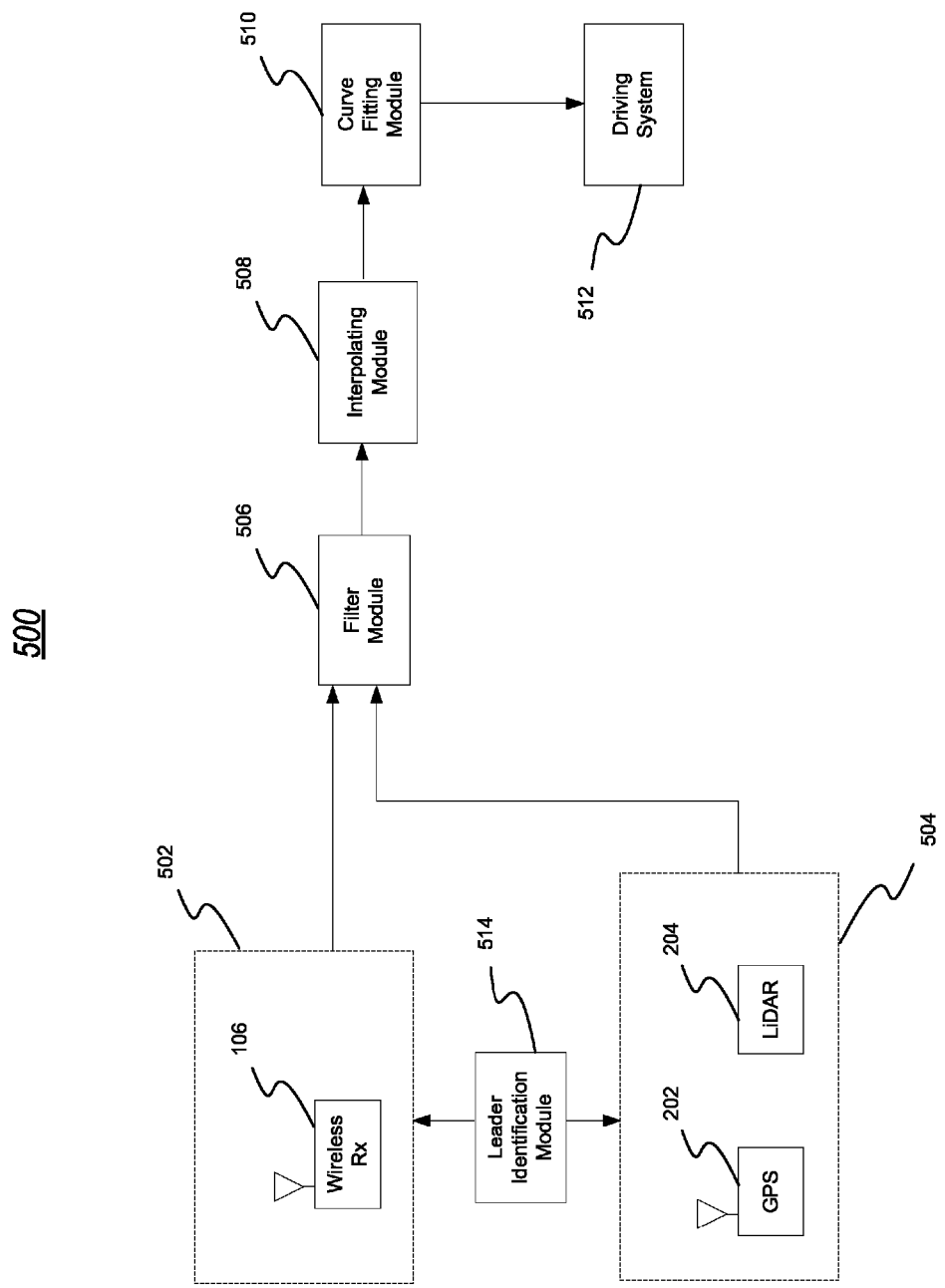
FIG. 5 illustrates a system block diagram of one exemplary embodiment consistent with the present disclosure.

Referring now to FIG. 5, there is shown a system block diagram 500 of one exemplary embodiment consistent with the present disclosure. The system, associated with the following vehicle, comprises acquisition modules 502 and 504, filtering module 506, interpolating module 508, curve fitting module 510, leader identification module 514 and driving system 512.

Acquisition module 502 may be configured to acquire waypoints, associated with the leader traversed path, through wireless receiver 106. The waypoints are transmitted over a wireless communications link between the following vehicle and the leader. The leader may obtain these waypoints from a GPS sensor located with the leader. The GPS sensor may be a high accuracy GPS sensor such as a differential GPS sensor. An alternative, or additional, acquisition module 504 may also be configured to acquire waypoints associated with the leader traversed path. Acquisition module 504 determines the position of the following vehicle from GPS sensor 202 and determines the distance and direction from the following vehicle to the leader from LiDAR 204. GPS sensor 202 may also be a high accuracy GPS sensor such as a differential GPS sensor. The location of the leader may then be determined by translating the GPS based location of the following vehicle by an offset corresponding to the distance and direction to the leader. This determined location of the leader may then be used as the acquired waypoint.

An optional leader identification module 514 may be configured to receive identifying information from one or more leaders and determine the identity of the leader to be followed. Leader identification module 514 may guide acquisition modules 502, 504 to acquire waypoints from the identified leader.

Filter module 506 may be configured to remove waypoints that are located outside of an area of interest. Such waypoints may have been corrupted by measurement errors and their removal may contribute to an improvement in the subsequent curve fitting and path estimation process. The area of interest may be dynamically updated from one waypoint to the next and may generally be defined such that waypoints within the area do not deviate from the estimated leader traversed path by more than an operationally determined threshold amount as previously described. In some embodiments, waypoints that would tend to cause the estimated leader traversed path to loop back on itself would generally be outside of the area of interest. Filter module 506 may also remove older acquired waypoints which lie behind the following vehicle as these waypoints become less useful in the curve fitting process.

Interpolating module 508 may be configured to generate intermediate waypoints in regions of the path where acquired waypoints are sparse, for example spaced from one another by 1 to 500 feet. An interpolation operation may be performed to generate an intermediate waypoint between acquired waypoints that are separated by a distance that exceeds a threshold distance. In some embodiments, the interpolation may be linear interpolation where, for example, a linearly interpolated point (x,y) between a first point $(x_1, y_1)$ and $(x_2, y_2)$ may be calculated as:

$x=(x_1+x_2)/2,$ $x=(y_1+y_2)/2,$

The generation of interpolated waypoints creates a more evenly distributed pattern of points which may improve the curve fitting process.

Curve fitting module 510 may be configured to spline fit the acquired and intermediate waypoints to a curve that is calculated to estimate the leader traversed path using a least-squares fitting process. Spline fitting may group waypoints associated with regions of the path into a number of intervals and then interpolate the waypoints in each of those intervals using polynomials of a selected degree such that each of the polynomial sections fit together in a smooth curve. The coefficients for each polynomial section are calculated to minimize the sum of the squares of the errors (distance) between each waypoint and the resulting curve.

Driving system 512 may be configured to control the propulsion and steering systems of the following vehicle such that the following vehicle drives along the calculated leader traversed path. Driving system 512 may employ a GPS sensor located with the following vehicle to determine the following vehicle's position relative to the path and make navigational corrections as required.

Figure 6:
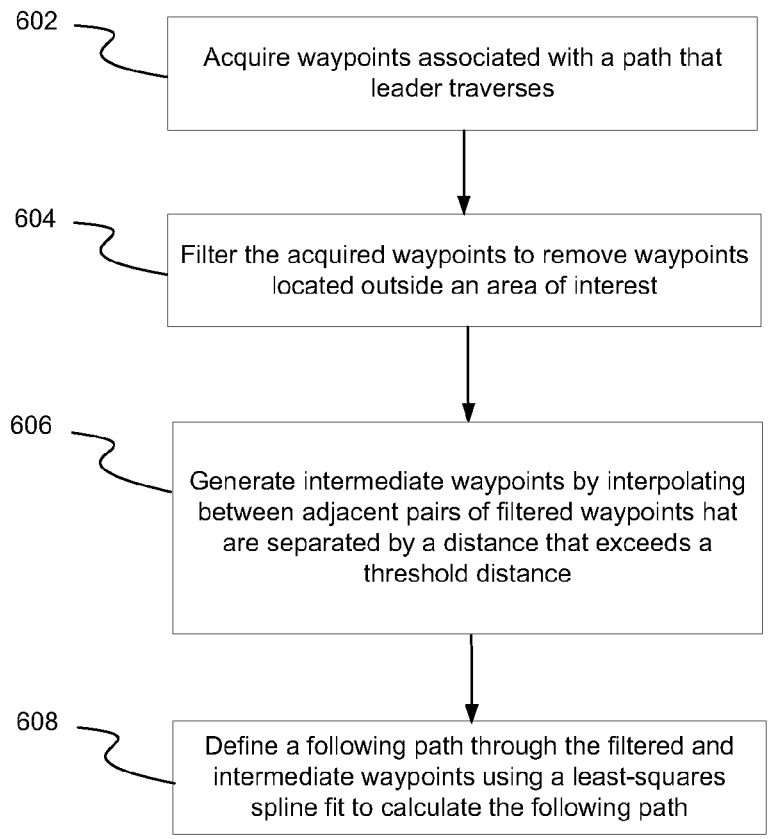
FIG. 6 illustrates a flowchart of operations of one exemplary embodiment consistent with the present disclosure.

Referring now to FIG. 6, there is shown a flowchart 600 of a method consistent with an exemplary embodiment of an autonomous following vehicle according to the present disclosure. At operation 602, waypoints are acquired by the following vehicle. The waypoints are associated with a path that a leader traverses. The leader may be another vehicle or a pedestrian. At operation 604, the acquired waypoints are filtered to remove waypoints that are located outside of an area of interest as previously described. At operation 606, intermediate waypoints are generated by interpolating between adjacent pairs of filtered waypoints that are separated by a distance that exceeds a threshold distance, for example 1 to 500 feet. At operation 608, a following path is defined through the filtered and intermediate waypoints using a least-squares spline fit to calculate the following path.

In some embodiments, the waypoints are received from the leader over a wireless communications link, having been generated by a GPS sensor located with the leader. In other embodiments, the waypoints are generated by determining the location of the following vehicle with a GPS sensor, located with the following vehicle, and determining an offset distance and direction to the leader with a LiDAR sensor. The offset distance and direction may then be used to translate the location of the following vehicle into a waypoint associated with the leader. Alternatively, a combination of these two waypoint generation methods may be used.

In some embodiments, previously acquired waypoints may be removed as new waypoints are acquired resulting in an improvement in the curve fitting process. Additionally, the remaining path length along the following path between the current position of the following vehicle and the current position of the leader may be determined and/or updated so that a desired speed and following distance are maintained. This may be useful to prevent the following vehicle from running out of drivable path.

In some embodiments, there may be multiple leaders and the following vehicle may be required to identify a particular leader to follow. The identification may be based on information transmitted from the leaders over the wireless communication link.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method for defining a following path for a following vehicle to autonomously follow a leader, comprising:

acquiring waypoints, said waypoints associated with a path that said leader traverses;

filtering said acquired waypoints, wherein said filtering comprises identifying a preceding waypoint and a subsequent waypoint and removing waypoints that exceed a threshold number of degrees outside of a course heading defined by said preceding waypoint and subsequent waypoint, wherein said threshold number of degrees is in the range of one to ten degrees and is selected based on a speed of said leader and a waypoint acquisition sampling rate;

generating intermediate waypoints by interpolating between adjacent pairs of said filtered waypoints if said adjacent pairs of said filtered waypoints are separated by a distance that exceeds a threshold distance;

removing a previously acquired waypoint as a new waypoint is acquired, if said removal generates a course change exceeding five degrees; and defining a following path through said filtered waypoints and said intermediate waypoints using a least-squares spline fit to calculate said following path, wherein said following vehicle traverses said following path.

2. The method of claim 1, wherein said acquiring waypoints further comprises receiving said waypoints from said leader over a wireless communication link, said waypoints generated by a global positioning sensor (GPS) located with said leader.

3. The method of claim 1, wherein said acquiring waypoints further comprises:

determining a position for said following vehicle using a GPS located with said following vehicle;

determining an offset distance and a direction from said following vehicle to said leader using a laser incident distance and ranging (LiDAR) sensor; and translating said position for said following vehicle by said offset distance in said direction, wherein said translating generates a waypoint.

4. The method of claim 1, further comprising removing previously acquired waypoints as new waypoints are acquired such that said spline fitting is based on a desired number of waypoints.

5. The method of claim 1, further comprising determining a remaining path length along said following path between a current position of said following vehicle and a current position of said leader, such that a desired speed and following distance are maintained.

6. The method of claim 1, further comprising identifying said leader.

7. The method of claim 1, wherein said leader is one of a vehicle or a pedestrian.

8. The method of claim 1, wherein said threshold distance is one to 500 feet.

9. A following vehicle configured to autonomously follow a leader, said following vehicle comprising:

an acquisition module configured to acquire waypoints associated with a path that said leader traverses;

a filtering module configured to filter said acquired waypoints, wherein said filtering comprises identifying a preceding waypoint and a subsequent waypoint and removing waypoints that exceed a threshold number of degrees outside of a course heading defined by said preceding waypoint and subsequent waypoint, wherein said threshold number of degrees is in the range of one to ten degrees and is selected based on a speed of said leader and a waypoint acquisition sampling rate;

an interpolating module configured to generate intermediate waypoints by interpolating between adjacent pairs of said filtered waypoints if said adjacent pairs of said filtered waypoints are separated by a distance that exceeds a threshold distance;

said acquisition module further configured to remove a previously acquired waypoint as a new waypoint is acquired, if said removal generates a course change exceeding five degrees; and a curve fitting module configured to define a following path through said filtered waypoints and said intermediate waypoints using a least-squares spline fit to calculate said following path.

10. The following vehicle of claim 9, further comprising a wireless communication link configured to receive said waypoints from said leader, said waypoints generated by a GPS located with said leader.

11. The following vehicle of claim 9, further comprising:

a GPS configured to determine a position for said following vehicle;

a LiDAR configured to determine an offset distance and a direction from said following vehicle to said leader; and a translating module configured to translate said position for said following vehicle by said offset distance in said direction, wherein said translating generates a waypoint.

12. The following vehicle of claim 9, wherein said acquisition module further removes previously acquired waypoints as new waypoints are acquired such that said curve fitting is based on a desired number of waypoints.

13. The following vehicle of claim 9, further comprising a speed control module configured to determine a remaining path length along said following path between a current position of said following vehicle and a current position of said leader, and maintain a desired speed and following distance to said leader based on said remaining path length.

14. The following vehicle of claim 9, further comprising an identification module configured to identify said leader.

15. The following vehicle of claim 9, wherein said threshold distance is one to 500 feet.

16. An article comprising a non-transitory storage medium having stored thereon instruction that when executed by a machine result in the following operations for defining a following path for a following vehicle to autonomously follow a leader:

acquiring waypoints, said waypoints associated with a path that a leader traverses;

filtering said acquired waypoints, wherein said filtering comprises identifying a preceding waypoint and a subsequent waypoint and removing waypoints that exceed a threshold number of degrees outside of a course heading defined by said preceding waypoint and subsequent waypoint, wherein said threshold number of degrees is in the range of one to ten degrees and is selected based on a speed of said leader and a waypoint acquisition sampling rate;

generating intermediate waypoints by interpolating between adjacent pairs of said filtered waypoints if said adjacent pairs of said filtered waypoints are separated by a distance that exceeds a threshold distance;

removing a previously acquired waypoint as a new waypoint is acquired, if said removal generates a course change exceeding five degrees; and defining a following path through said filtered waypoints and said intermediate waypoints using a least-squares spline fit to calculate said following path.

17. The article of claim 16 wherein said acquiring waypoints further comprises receiving said waypoints from said leader over a wireless communication link, said waypoints generated by a GPS located with said leader.

18. The article of claim 16 wherein said acquiring waypoints further comprises:

determining a position for said following vehicle using a GPS located with said following vehicle;

determining an offset distance and a direction from said following vehicle to said leader using a LiDAR sensor; and translating said position for said following vehicle by said offset distance in said direction, wherein said translating generates a waypoint.

19. The article of claim 16, further comprising determining a remaining path length along said following path between a current position of said following vehicle and a current position of said leader, such that a desired speed and following distance are maintained.

20. The article of claim 16, wherein said threshold distance is one to 500 feet.

* * * * *